(12) United States Patent
Weston et al.

(10) Patent No.: US 10,402,750 B2
(45) Date of Patent: Sep. 3, 2019

(54) IDENTIFYING ENTITIES USING A DEEP-LEARNING MODEL

(71) Applicant: Facebook, Inc., Menlo Park, CA (US)

(72) Inventors: Jason E. Weston, New York, NY (US);
Keith Adams, Palo Alto, CA (US);
Sumit Chopra, Jersey City, NJ (US)

(73) Assignee: Facebook, Inc., Menlo Park, CA (US)

( * ) Notice: Subject to any disclaimer, the term of this patent is extended or adjusted under 35 U.S.C. 154(b) by 887 days.

(21) Appl. No.: 14/984,956

(22) Filed: Dec. 30, 2015

(65) Prior Publication Data
US 2017/0193390 A1    Jul. 6, 2017

(51) Int. Cl.
*G06F 15/18*    (2006.01)
*G06N 20/00*    (2019.01)
*G06Q 50/00*    (2012.01)

(52) U.S. Cl.
CPC ............ *G06N 20/00* (2019.01); *G06Q 50/01* (2013.01)

(58) Field of Classification Search
CPC .. G06F 12/12; G06F 9/45516; G06F 12/0813; G06F 12/0875; G06F 12/0891; G06F 17/30126; G06F 17/30312; G06F 17/3033; G06F 2212/154; G06F 2212/452; G06F 2212/60; G06F 2212/62; G06F 8/71; G06F 9/34; G06F 9/4881; G06F 9/5016; G06F 9/5038; G06F 12/0811; G06F 12/084; G06F 12/0842; G06F 12/0848; G06F 12/121; G06F 2212/1024; G06F 2212/282; G06F 2212/604; G06F 2212/6042;
(Continued)

(56) References Cited

U.S. PATENT DOCUMENTS 9,147,154 B2    9/2015 Wang et al.
9,589,237 B1 *  3/2017 Qamar ................. G06F 16/245
(Continued)

FOREIGN PATENT DOCUMENTS

WO    2014/100005    6/2014
WO    2015/094397    6/2015

OTHER PUBLICATIONS

European Search Report for EP 16177148.0-1879, dated May 12, 2017.
(Continued)

*Primary Examiner* — Luis A Sitiriche
(74) *Attorney, Agent, or Firm* — Baker Botts L.L.P.

(57) ABSTRACT

In one embodiment, a method includes accessing a first set of entities, with which a user has interacted, and a second set of entities in a social-networking system. A first set of vector representations of the first set of entities are determined using a deep-learning model. A target entity is selected from the first set of entities, and the vector representation of the target entity is removed from the first set. The remaining vector representations in the first set are combined to determine a vector representation of the user. A second set of vector representations of the second set of entities are determined using the deep-learning model. Similarity scores are computed between the user and each of the target entity and the entities in the second set of entities. Vector representations of entities in the second set of entities are updated based on the similarity scores using the deep-learning model.

21 Claims, 9 Drawing Sheets

(58) Field of Classification Search
CPC . G06F 8/437; G06F 8/443; G06F 8/48; G06F 9/30192; G06F 9/3836; G06F 17/3002; G06F 17/30035; G06F 17/30038; G06F 17/30867; G06F 17/30893; G06F 17/30976; G06F 8/41; G06F 9/44521; G06F 9/449; G06F 9/4552; G06F 17/2765; G06F 17/2785; G06F 17/279; G06F 17/3053; G06F 17/30598; G06F 17/30654; G06F 17/30657; G06F 17/30675; G06F 2209/521; G06F 3/0482; G06F 3/0484; G06F 9/3004; G06F 9/30087; G06F 9/526; G06N 3/0454; G06N 3/084; G06N 99/005; G06N 5/02; G06N 3/04; G06N 3/063; G06N 20/00; H04L 67/1097; G06K 9/00744; G06K 9/00677; G06Q 50/01; G01N 2800/364; G01N 33/57407; G01N 33/57411; G01N 33/57415; G01N 33/57449; G01N 33/57484

See application file for complete search history.

(56) References Cited

U.S. PATENT DOCUMENTS

| | | |
|---|---|---|
| 2006/0294101 A1 | 12/2006 | Wnek |
| 2006/0294134 A1 | 12/2006 | Berkhim |
| 2009/0132213 A1* | 5/2009 | Zhao ................. G06K 9/6248 703/2 |
| 2013/0073568 A1* | 3/2013 | Federov ........... G06F 17/30867 707/749 |
| 2013/0318351 A1* | 11/2013 | Hirano ................ H04L 9/3073 713/168 |
| 2014/0279773 A1 | 9/2014 | Chen |
| 2014/0279774 A1 | 9/2014 | Wang |
| 2015/0003701 A1 | 1/2015 | Klauschen |
| 2015/0019640 A1 | 1/2015 | Li |
| 2015/0293976 A1 | 10/2015 | Guo |
| 2015/0310862 A1* | 10/2015 | Dauphin ............ G10L 15/1815 704/257 |
| 2015/0331908 A1* | 11/2015 | Duffy ............... G06F 17/30477 707/765 |
| 2015/0340032 A1 | 11/2015 | Gruenstein |
| 2016/0110646 A1* | 4/2016 | Somekh .................. G06N 5/04 706/46 |

OTHER PUBLICATIONS

Perozzi, et al. "DeepWalk: Online Learning of Social Representations" ACM, Knowledge Discovery and Data Mining, Aug. 24, 2014.

International Search Report and Written Opinion for International Application PCT/US2016/018367, dated Aug. 24, 2016.

* cited by examiner

IDENTIFYING ENTITIES USING A DEEP-LEARNING MODEL

TECHNICAL FIELD

This disclosure generally relates to training a deep-learning model.

BACKGROUND

Deep-learning is a type of machine learning that may involve training a model in a supervised or unsupervised setting. Deep-learning models may be trained to learn representations of data. As an example and not by way of limitation, a deep-learning model may represent data as vectors of intensity values. Deep-learning models may be used in classification of data. Classification may involve determining which of a set of categories a data point belongs to by training the deep-learning model.

SUMMARY OF PARTICULAR EMBODIMENTS

In particular embodiments, a social-networking system may use a deep-learning model to predict relevant entities for a user. The deep-learning model may be trained to map entities to vector representations. A vector representation of a user may be determined based on a set of entities with which the user has interacted in a social-networking system. In particular embodiments, a target entity may be selected and removed from the set of entities with which the user has interacted. The vector representations of the remaining entities in the set of entities may be combined to yield a vector representation of the user. The deep-learning model may be trained using the target entity as a supervisory signal. Vector representations of entities with which the user has not interacted may be determined using the deep-learning model. An embedding of an entity or the user may be determined based on the respective vector representation, which may correspond to coordinates of a point in a multi-dimensional embedding space. The embedding may be a representation of an entity or user in the embedding space. The embedding space may include one or more user embeddings and a plurality of embeddings of entities. These user and entity embeddings may be used to accomplish any number of suitable tasks. As an example and not by way of limitation, the social-networking system may employ a search algorithm to identify one or more entities—with which the user has not interacted—that have embeddings proximate to the user embedding in the embedding space. The social-networking system may determine that the identified entities are relevant to the user.

In particular embodiments, the identified entities may be sent as recommendations to a client system of the user. The identified entities may be displayed to the user as suggestions on an interface of an application running on the client system (e.g., a messaging platform or an application associated with the social-networking system). The user may select one or more entities from the set of identified entities, and the selected entity may, as an example and not by way of limitation, link the user to another page in an application hosted by the social-networking system.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
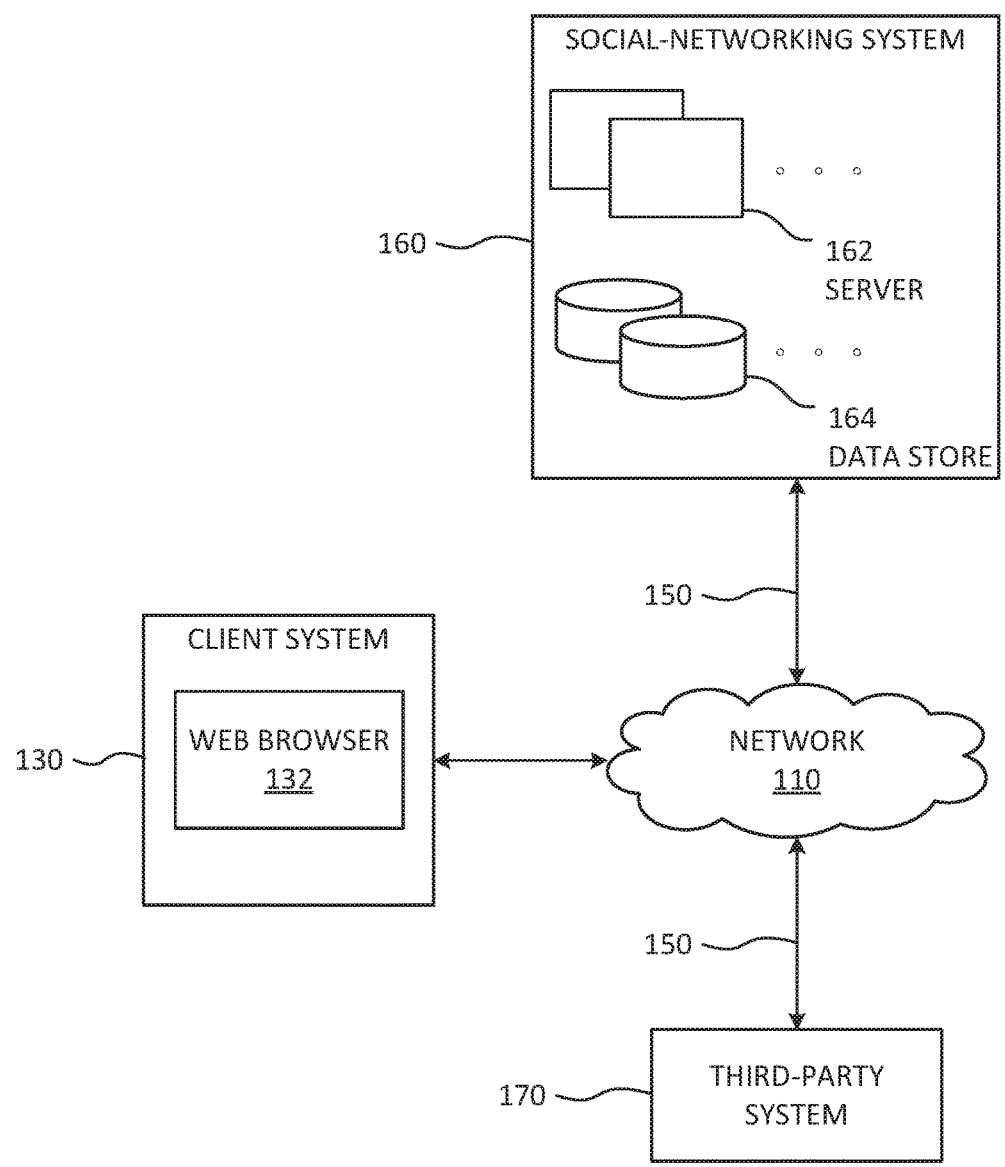
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
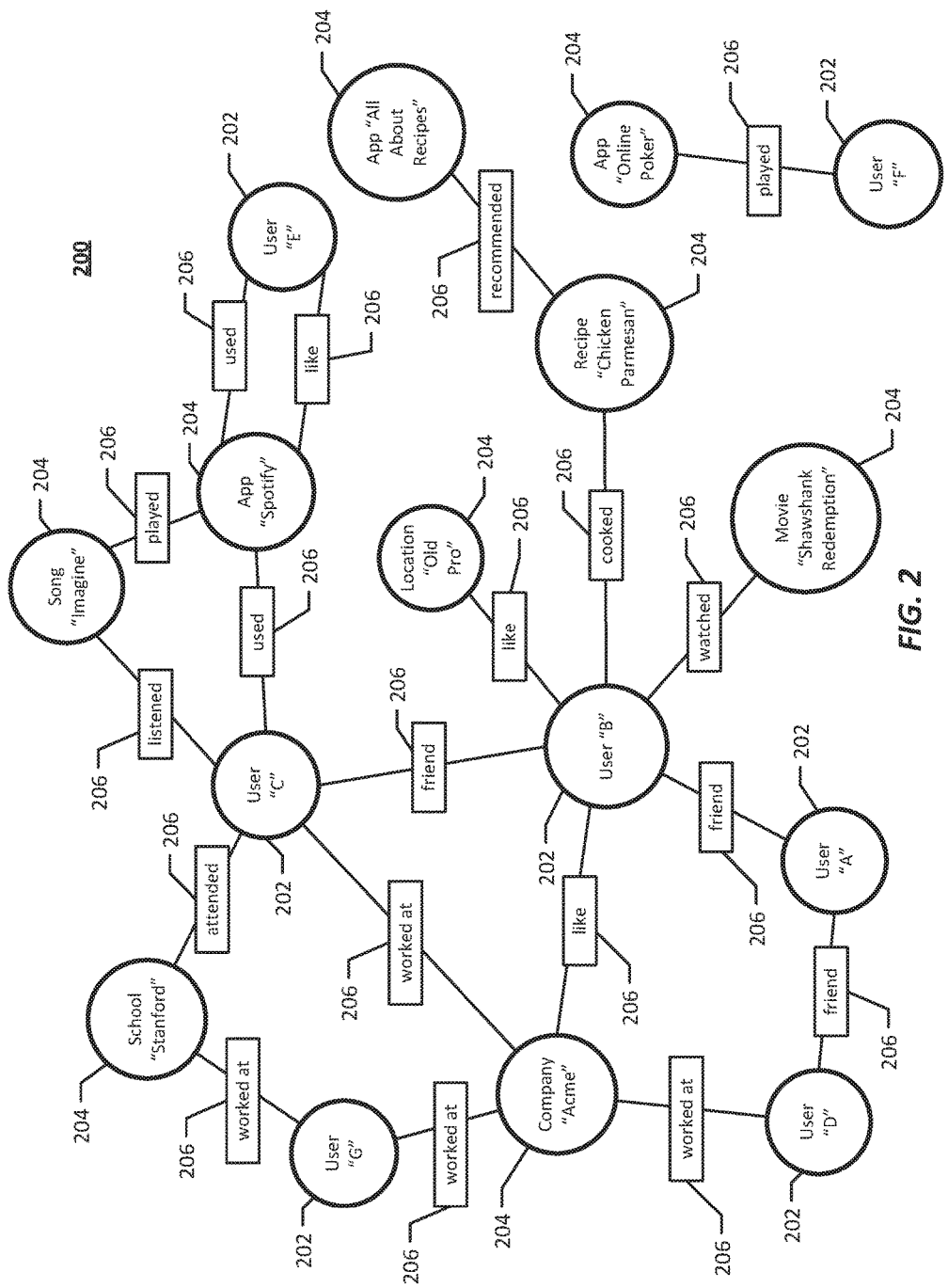
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (e.g., for example, a movie theater, restaurant, landmark, or city); a website (e.g., a website associated with social-network system 160 or a third-party website associated with a web-application server); an entity (e.g., a person, business, group, sports team, or celebrity); a resource (e.g., an audio file, video file, digital photo, text file, structured document, or application) which may be located within social-networking system 160 or on an external server, such as a web-application server; real or intellectual property (e.g., a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B."

Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Training a Deep-Learning Model

Particular embodiments identify one or more entities as being relevant to a user using a deep-learning model. In particular embodiments, an entity may be any suitable entity that may be represented by a concept node 204 or user node 202 in social graph 200 (e.g., person, business, group, sports team, or celebrity). In particular embodiments, an entity may be, as an example and not by way of limitation, a page hosted by social-networking system 160 (e.g., profile pages, place pages, business pages), text content (e.g., one or more n-grams), visual content (e.g., one or more images), audio content (e.g., one or more audio recordings), video content (e.g., one or more video clips), a label (e.g., a sticker or hashtag), any other suitable type of content, any other suitable entity, or any combination thereof. As used herein, labels may be hashtags, emoji, stickers, ideograms, any other suitable text annotations, any other suitable characters, symbols, or images, which each may represent an idea or thing with or without using letters or words, or any combination thereof. As used herein, hashtags may be single tokens made up of natural language n-grams or abbreviations, prefixed with the character "#" (e.g., #blessed). As used herein, n-grams may be words or groups of words, any part of speech, punctuation marks (e.g., "!"), colloquialisms (e.g., "go nuts"), acronyms (e.g., "BRB"), abbreviations (e.g., "mgmt."), exclamations ("ugh"), alphanumeric characters, symbols, written characters, accent marks, or any combination thereof.

Figure 3:
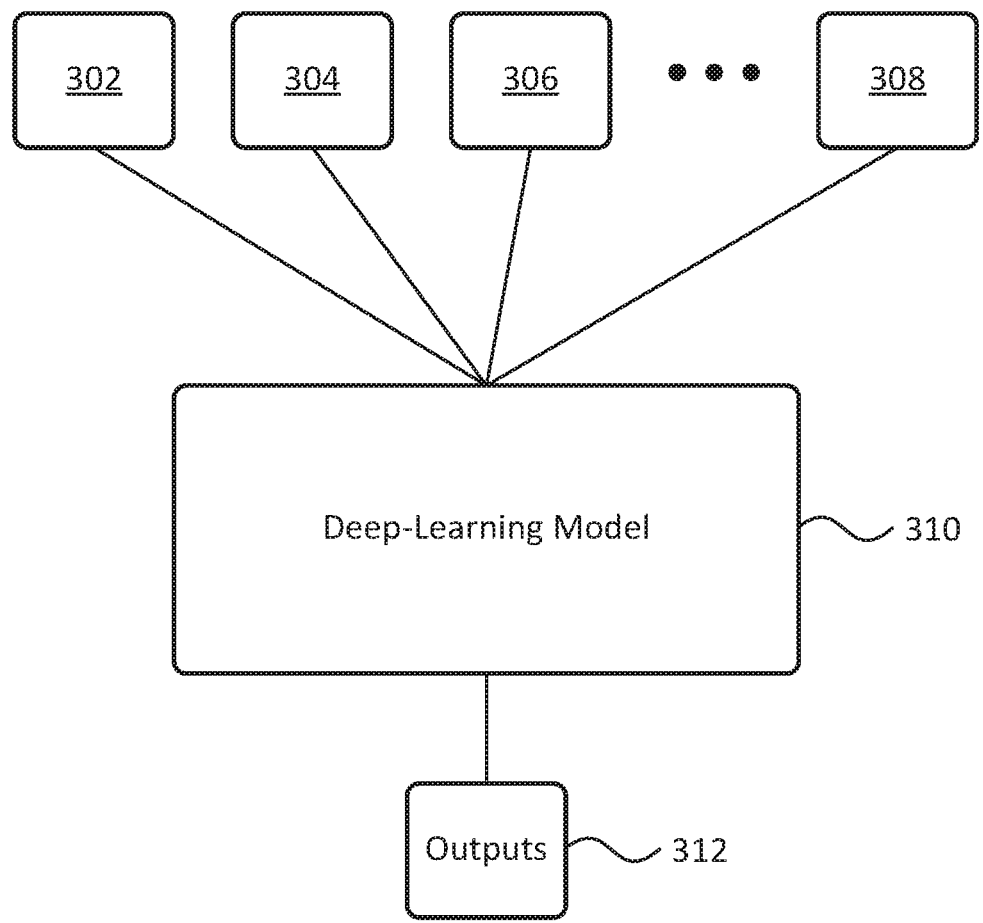
FIG. 3 illustrates an example deep-learning model.

FIG. 3 illustrates an example deep-learning model 310. Deep-learning model 310 may be a machine-learning model, a neural network, a latent neural network, any other suitable deep-learning model, or any combination thereof. In particular embodiments, deep-learning model 310 may have a plurality of layers of abstraction. Inputs 302, 304, 306, and 308 may be any suitable number of entities. Outputs 312 may be one or more embeddings of entities. The embedding space may be a multi-dimensional space (e.g., d-dimensional, where d is a hyper-parameter that controls capacity) and may include a plurality of points corresponding to embeddings of entities. As used herein, an embedding of an entity refers to a representation of an entity in the embedding space. Although a particular number of input entities 302, 304, 306, and 308 are illustrated in FIG. 3, deep-learning model 310 may generate embeddings of entities for any suitable number of input entities 302, 304, 306, and 308.

In particular embodiments, deep-learning model 310 (e.g., a neural network) may include one or more indices that map entities to vectors in $\mathbb{R}^d$, where $\mathbb{R}$ denotes the set of real numbers and d is a hyper-parameter that controls capacity. The vectors may be d-dimensional intensity vectors. As used herein, intensity values may be any suitable values in the range of −1 to 1. Each of the vector representations of entities may provide coordinates for respective points in the embedding space. Although a particular number of input entities 302, 304, 306, and 308 are illustrated in FIG. 3, deep-learning model 310 may provide mappings between any suitable number of entities 302, 304, 306, and 308 and vector representations.

Deep-learning model 310 may be trained to generate optimal embeddings of entities. Deep-learning model 310 may include one or more indices (i.e., dictionaries), which may be dynamically updated as the deep-learning model 310 is trained. The one or more indices may be generated during a training phase of deep-learning model 310. In particular embodiments, the deep-learning model may include one or more indices trained to map entities to vector representations. Deep-learning model 310 may be, for example, a neural network or a latent neural network. Deep-learning model 310 may be initialized using a random distribution. That is, deep-learning model 310 may initially have randomly-assigned mappings (i.e., between entities 302, 304, 306, and 308 and vector representations, based on which embeddings of entities 302, 304, 306, and 308 may be generated). As an example and not by way of limitation, the random distribution may be a Gaussian distribution. The training may result in the one or more indices of deep-learning model 310 generating more optimal mappings than the initial mappings.

In particular embodiments, the deep-learning model 310 may have one or more of the features of the deep-learning model described in co-pending U.S. patent application Ser. No. 14/949,436, filed 23 Nov. 2015, and 62/251352, filed 5 Nov. 2015, which are incorporated by reference herein.

Although this disclosure describes and illustrates particular embodiments of FIG. 3 as being implemented by social-networking system 160, this disclosure contemplates any suitable embodiments of FIG. 3 as being implemented by any suitable platform or system. As an example, and not by way of limitation, particular embodiments of FIG. 3 may be implemented by client system 130, third-party system 170, or any other suitable system. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
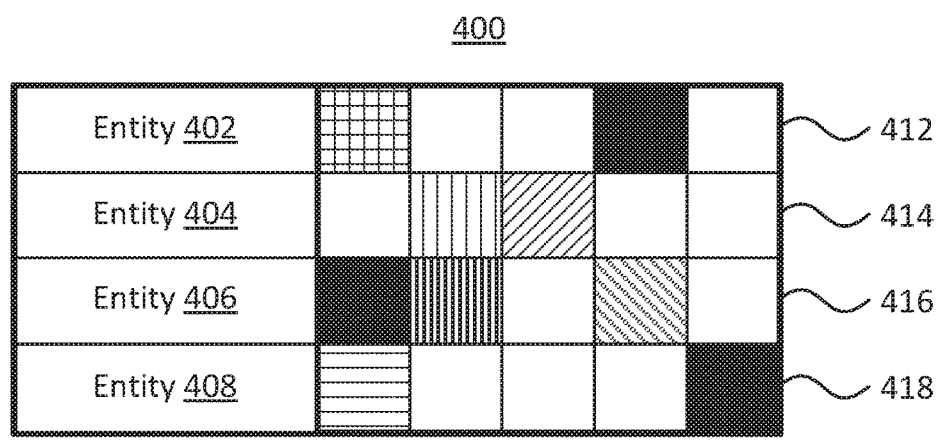
FIG. 4 illustrates an example dictionary mapping entities to vector representations.

FIG. 4 illustrates example dictionary 400 mapping entities 402, 404, 406, and 408 to vector representations 412, 414, 416, and 418. Entities 402, 404, 406, and 408 may be, as an example and not by way of limitation, pages hosted by social-networking system 160. In particular embodiments, dictionary 400 may be generated by social-networking system 160. In particular embodiments, dictionary 400 may map entities to vectors in $\mathbb{R}^d$, where $\mathbb{R}$ denotes the set of real numbers and d is a hyper-parameter that controls capacity. Vector representations 412, 414, 416, and 418 may be d-dimensional intensity vectors. As used herein, intensity values may be any suitable values in the range of −1 to 1. For illustrative purposes and not by way of limitation, the intensity values in example vector representations 412, 414, 416, and 418 are depicted as patterns in FIG. 4. For example, dictionary 400 maps entity 402 to vector representation 412, which is illustrated as the top row of cells of various patterns, adjacent to page 402, in dictionary 400. Although dictionary 400 is depicted as being of a particular size (i.e., dimensions), this is merely illustrative, not by way of limitation. Dictionary 400 may be of any suitable sizes. Dictionary 400 may provide mappings between any suitable number of entities and vector representations.

Each of the vector representations of the entities, determined using dictionary 400 may provide coordinates for respective points in an embedding space. The embedding space may be a multi-dimensional space (e.g., d-dimensional) and may include a plurality of points corresponding to entity embeddings. As used herein, an entity embedding refers to a representation of an entity in the embedding space based on the vector representation of the entity (e.g., determined using dictionary 400). Each entity embedding may correspond to a respective point in the embedding space. In particular embodiments, each entity may be represented as a set of entities (e.g., a page may be represented as a set of text items appearing on the page), and the entity embedding may be determined based on vector representations of the set of entities (e.g., a non-linear combination of the vector representations of text items on the page). As another example and not by way of limitation, a user may be represented as a set of entities (e.g., as a set of pages that the user has "liked" in social-networking system 160), and an embedding of the user may be determined based on the vector representations of the entities in the set. Each of the entities in the set may, as described above, be represented, in turn, as a set of entities (e.g., each entity vector representation may be based on vector representations of a set of entities). This technique for hierarchically representing entities as sets of entities may continue as many levels as suitable. That is, as an example and not by way of limitation, each entity may be represented as a set of entities, which may each be represented as a set of entities, and so forth.

Dictionary 400 may be part of a deep-learning model. To generate optimal embeddings, the deep-learning model may be trained. Dictionary 400 may be generated during a training phase of the deep-learning model. The deep-learning model may be, for example, a convolutional neural network. Dictionary 400 may be initialized using a random distribution. That is, dictionary 400 may initially have randomly-assigned mappings. As an example and not by way of limitation, the random distribution may be a Gaussian distribution. The training may result in dictionary 400 generating more optimal mappings than the initial mappings.

Although this disclosure describes and illustrates particular embodiments of FIG. 4 as being implemented by social-networking system 160, this disclosure contemplates any suitable embodiments of FIG. 4 as being implemented by any suitable platform or system. As an example, and not by way of limitation, particular embodiments of FIG. 4 may be implemented by client system 130 or third-party system 170. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
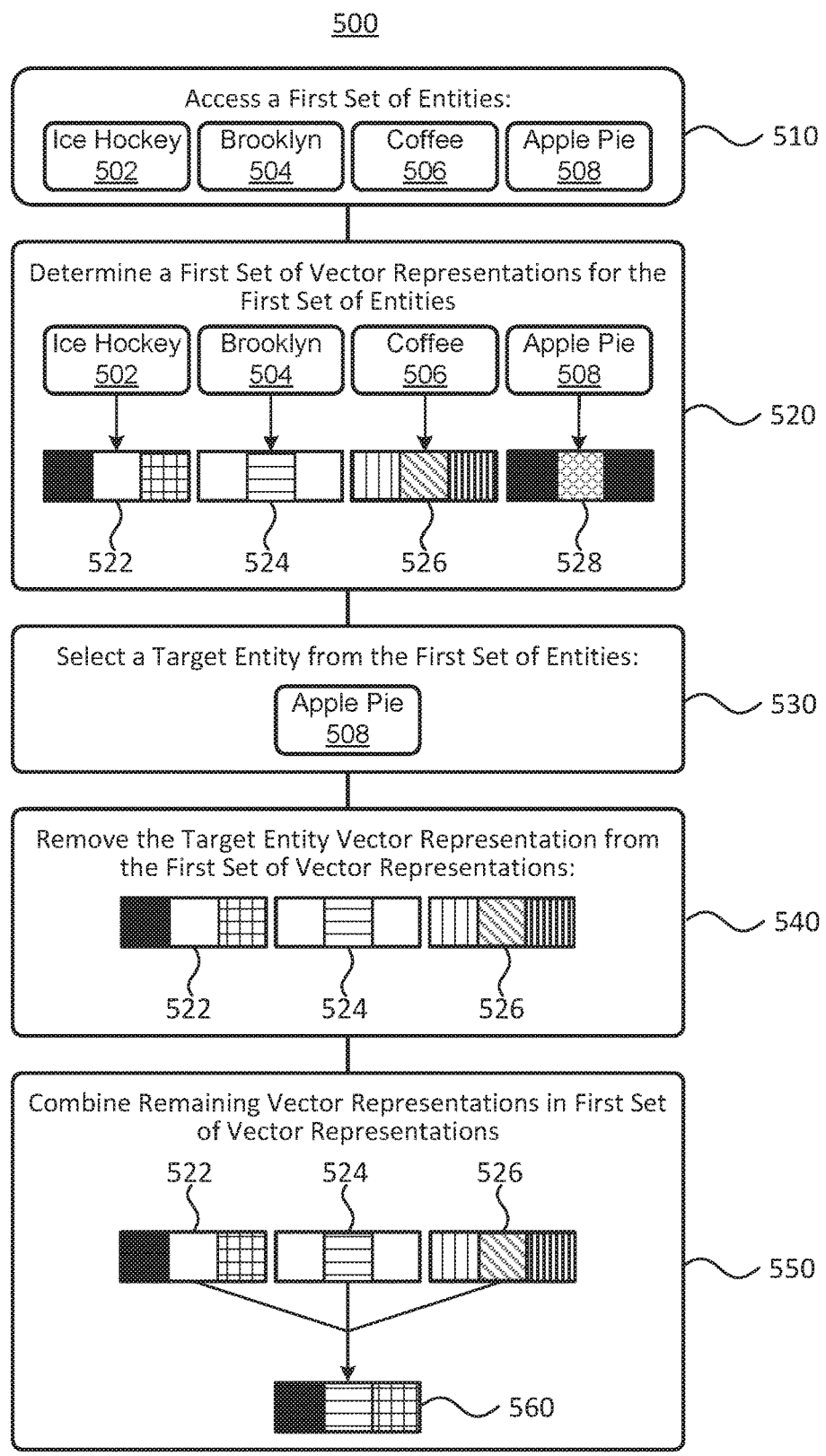
FIG. 5 illustrates an example method for determining an embedding of user using a deep-learning model.

FIG. 5 illustrates an example method for determining an embedding of user using a deep-learning model. In particular embodiments, a user may be represented as a set of entities with which the user has interacted in social-networking system 160. In other words, an embedding may be determined for the user based on the vector representations of a set of entities. The set of entities may be an unordered set. At step 510, social-networking system 160 may access a first set of entities that the user has interacted with in social-networking system 160. The user may interact with the entities of the first set of entities in social-networking system 160 using any suitable social-networking action. As an example and not by way of limitation, the interaction may be an expression of affinity for the entity. As another example and not by way of limitation, the user may interact with an entity by "liking" the entity, sharing the entity, publishing a post that includes a reference to the entity, composing and sending a message to another user in which the entity is mentioned, performing any other suitable social-networking action, or any combination thereof. In particular embodiments, a first node in social graph 200, described in connection with FIG. 2, may correspond to the user, and a plurality of second nodes in social graph 200 may each correspond to an entity. The user may interact with the first set of entities by a social-networking action of the user, and the social-networking action may be taken with respect to the first node and a respective second node corresponding to a respective entity of the first set of entities. For example, the social-networking action may result in the creation of an edge in social graph 200 between a first node corresponding to the user and a second node corresponding to an entity. The first set of entities may include any suitable number of entities. In the illustrated example of FIG. 5, the first set of entities is shown as including entities 502, 504, 506, and 508: pages corresponding to "ice hockey," "Brooklyn," "coffee," and "apple pie." Entities 502, 504, 506, and 508 of the first set of entities may be, as an example and not by way of limitation, pages hosted by social-networking system 160 that the user has "liked" or otherwise expressed affinity for in social-networking system 160.

At step 520, social-networking system 160 may determine a first set of vector representations for the first set of entities. In particular embodiments, social-networking system 160 may map each entity 502, 504, 506, and 508 to a respective vector representation (e.g., one-to-one mapping), using, as an example and not by way of limitation, dictionary 400, which is generated using the deep-learning model. Each entity 502, 504, 506, and 508 may be mapped to a respective vector representation 522, 524, 526, and 528 using any of the techniques described above in connection with FIG. 4 or any other suitable techniques.

At step 530, social-networking system 160 may select a target entity from the first set of entities. In the illustrated example of FIG. 5, social-networking system 160 selects entity 508 as the target entity. In particular embodiments, the target entity may be selected randomly. In particular embodiments, the target entity may be selected by the deep-learning model. In particular embodiments, the target entity may be selected using a heuristic method for finding hard examples of entities. For example, entities may be clustered or hashed in the embedding space (e.g., using the deep-learning model), and hard examples may be entities in the same cluster or hash in the embedding space. In the illustrated example of FIG. 5, the target entity is depicted as entity 508, which corresponds to a page for "apple pie" that is hosted by social-networking system 160.

At step 540, social-networking system 160 may remove the vector representation of the target entity selected at step 530 from the first set of vector representations. In the illustrated example of FIG. 5, the vector representation 528 of the target entity 508 has been removed from the first set of vector representations. The resultant first set of vector representations is shown as including vector representations 522, 524, and 526, which correspond respectively to entities 502, 504, and 506.

At step 550, social-networking system 160 may combine the remaining vector representations 522, 524, and 526. Any suitable technique may be used to combine vector representations 522, 524, and 526 into a single vector representation 560, including, as an example and not by way of limitation, convolution, averaging, any other suitable non-linear combination technique, any other suitable technique, or any combination thereof. In the illustrated example of FIG. 5, social-networking system 160 combines the three vectors 522, 524, and 526 (e.g., a 3-tap convolution) and then performs a max pooling operation to yield one vector representation 560 of the user.

An embedding of the user may be determined based on the combination of the vector representations. In particular embodiments, social-networking system 160 may determine an embedding of the user based on the vector representation 560. As used herein, an embedding of a user may refer to a representation of the user in an embedding space based on the combined vector representation 560 of the user. Coordinates for a point in an embedding space may be determined based on vector representation 560 of the user. In particular embodiments, the deep-learning model may be used to generate a plurality of user embeddings. Each of these user embeddings may be based on a respective vector representation that corresponds to a particular point in an embedding space. In particular embodiments, the deep-learning model may be used to generate a plurality of embeddings of entities. Each of the entity embeddings may be based on a respective vector representation that corresponds to a particular point in the embedding space. In particular embodiments, the point in the embedding space corresponding to the user may be proximate to points in the embedding space corresponding to entities in the first set of entities (i.e., entities with which the user has interacted in social-networking system 160).

Although this disclosure describes and illustrates particular embodiments of FIG. 5 as being implemented by social-networking system 160, this disclosure contemplates any suitable embodiments of FIG. 5 occurring on any suitable interface and as being implemented by any suitable platform or system. As an example, and not by way of limitation, particular embodiments of FIG. 5 may be implemented by client system 130 or third-party system 170. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
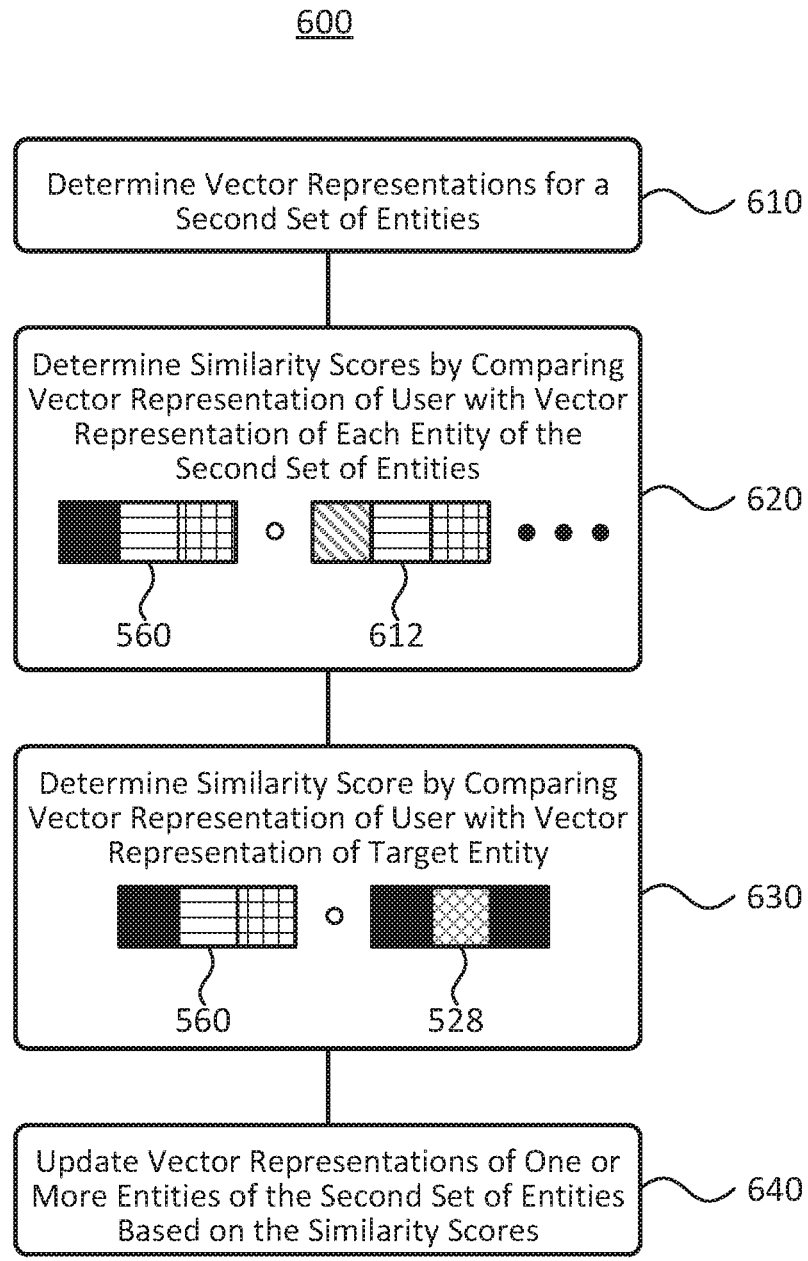
FIG. 6 illustrates an example method for training a deep-learning model.

FIG. 6 illustrates an example method for training a deep-learning model. The deep-learning model may be trained to minimize or reduce error between the vector representation of the user and the vector representations of entities that are relevant to the user. In particular embodiments, a goal of the training of the deep-learning model may be to generate entity embeddings for relevant entities that correspond to points in an embedding space that are proximate to the point corresponding to the user embedding. Relevance, between a user and an entity, may be determined based on any suitable factors, including for example and not by way of limitation, the user's prior interaction with entities in social-networking system 160, any other suitable social-networking information of the user, or both (e.g., information regarding social-networking connections of the user). In particular embodiments, the deep-learning model may be trained using the target entity 508 (e.g., page corresponding to "apple pie") selected at step 530 of FIG. 5 as a supervisory signal. As an example and not by way of limitation, the deep-learning model may trained so that the embedding of target entity 508 is more proximate to the user embedding in the embedding space than the embeddings of entities with which the user has not interacted.

At step 610, social-networking system 160 may determine vector representations for a second set of entities using the deep-learning model. As an example and not by way of limitation, the vector representations of the entities in the second set of entities may be determined using a dictionary 400. In particular embodiments, the second set of entities may be randomly selected from a plurality of entities. In particular embodiments, the second set of entities may include one or more entities with which the user has not interacted in social-networking system 160. The second set of entities may be considered, for purposes of training the deep-learning model, negative examples (i.e., entities not known to be relevant to the user), whereas the first set of entities may be positive examples (i.e., entities known to be relevant to the user). The second set of entities may include any suitable number of entities. In an example and not by way of limitation, the second set of entities may include fifty entities that are randomly selected by social-networking system 160. In particular embodiments, the number of entities in the second set of entities may be based on a loss function of the deep-learning model. As an example and not by way of limitation, the number of entities in the second set of entities may be a fixed hyper-parameter based on the available computational budget. In particular embodiments, a loss function may be used to train the deep-learning model. To learn the optimal weights (i.e., parameters) of the deep-learning model, social-networking system 160 may minimize a loss function (i.e., minimize error). In particular embodiments, social-networking system 160 may update vector representations of the second set of entities in a batch. As an example and not by way of limitation, a set of negative examples of entities (e.g., entities not known to be relevant to the user) may be selected as a batch of an arbitrary, fixed size. As an example and not by way of limitation, the size of the batch (i.e., the number of entities in the second set of entities) may be a parameter that is fixed in advance across all training of the deep-learning model. As another example and not by way of limitation, the size of the batch may also change over time during training or the deep-learning model. As another example and not by way of limitation, the size of the batch may be a function of the deep-learning model. Social-networking system 160 may then perform a batch gradient update over this second set of entities (i.e., the batch of negative examples).

At step 620, social-networking system 160 may determine similarity scores by comparing the vector representation of the user 560 with the vector representations determined at step 610 of each entity of the second set of entities. Thus, social-networking system 160 may determine a measure of similarity to the user for each entity of the second set of entities. Although FIG. 6 is depicted as comparing vector representation of the user 560 to a single vector representation of an entity 612 of the second set of entities, it will be understood that this is for illustrative purposes only and not by way of limitation. Rather, vector representation of the user 560 may be compared to a vector representation of each entity of the second set of entities so that a similarity score may be computed for each entity of the second set of entities. In particular embodiments, a similarity score between the user and an entity of the second set of entities may be determined based on an angle between the vector representations of the user 560 and the vector representation of the entity. In particular embodiments, a similarity score between the user and an entity of the second set of entities may be determined by computing a dot product of vector representation of the user 560 and the vector representation of the entity. In particular embodiments, a similarity score may be determined based on Euclidean distance, cosine similarity, or any other suitable technique for computing a measure of pairwise relevance of points in an embedding space.

At step 630, social-networking system 160 may determine a similarity score by comparing the vector representation of the user 560 with the vector representation 528 of the target entity 508, determined at step 520 of FIG. 5. Thus, social-networking system 160 may determine a measure of similarity to the user for the target entity. The similarity score between the user and the target entity 508 may be determined using any of the techniques described in connection with step 620 or using any other suitable technique.

In particular embodiments, social-networking system 160 may rank the target entity and the entities of the second set of entities against each other based on the similarity scores determined for each at steps 620 and 630. Ranking may be accomplished by assigned each entity a numerical rank, assigning each entity a position in a single-columned table, or using any other suitable technique for ranking the entities against each other based on the similarity scores of each. As an example and not by way of limitation, social-networking system 160 may assign each entity a numerical rank, and a higher numerical rank may correspond to a higher similarity score.

At step 640, social-networking system 160 may update vector representations of one or more entities in the second set of entities based on the similarity scores determined at steps 620 and 630. In particular embodiments, the vector representations may be updated based on a comparison of the similarity score determined at step 620 with each of the similarity scores determined at step 630. In particular embodiments, social-networking system 160 may assign rankings to each of the target entity and the second set of entities, and the one or more weights of the deep-learning model may be updated further based on the rankings. As described above, the deep-learning model may trained so that the embedding of target entity 508 is more proximate to the user embedding in the embedding space than the embeddings of entities with which the user has not interacted. Thus, the deep-learning model, may be trained so that each of the entities of the second set of entities (i.e., negative samples) has a lower similarity score than the target entity (i.e., a positive sample). In other words, the deep-learning model may be trained so that each of the entities of the second set of entities is ranked lower than the target entity. Social-networking system 160 may determine that one or more of the entities of the second set of entities are ranked above or have higher similarity scores than the target entity (i.e., have corresponding embeddings that are more proximate to the user embedding in the embedding space), and social-networking system 160 may update vector representations of one or more entities of the second set of entities. As an example and not by way of limitation, an entity in the second set of entities may be a page hosted by social-networking system 160 that corresponds to "running." In the same example, social-networking system 160 may determine that the "running" entity has a higher similarity score (i.e., computed between the vector representation of the user 560 and the vector representation of the "running" entity) than the target entity (i.e., computed between the vector representation of the user 560 and the vector representation 528 of the target entity 508). Social-networking system 160 may update the vector representation of the "running" entity so that an updated similarity score for the "running" entity (i.e., computed between the vector representation of the user 560 and the updated vector representation of the "running" entity) is less than the similarity score for the target entity 508.

In particular embodiments, social-networking system 160 may update the vector representations of the one or more entities of the second set of entities by updating one or more weights of the deep-learning model. Initial values of the one or more weights of the deep-learning model may be randomly determined (e.g., using a Gaussian distribution). In particular embodiments, one or more of the weights of the deep-learning model may be updated to minimize error using similarity scores determined at steps 620, between the user and the entities of the second set of entities, and at step 630, between the user and the target entity 508. In particular embodiments, one or more weights of the deep-learning model may be updated to minimize error given by Eq. 1. The weights of the deep-learning model may be updated to yield better vector representations for the second set of entities. This method described in steps 610-640 may be repeated, and a stochastic gradient descent function may be used to gradually refine the weights. Training the deep-learning model by updating the weights may improve the mappings of dictionary 400.

Although this disclosure describes and illustrates particular embodiments of FIG. 6 as being implemented by social-networking system 160, this disclosure contemplates any suitable embodiments of FIG. 6 occurring on any suitable interface and as being implemented by any suitable platform or system. As an example, and not by way of limitation, particular embodiments of FIG. 6 may be implemented by client system 130 or third-party system 170. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
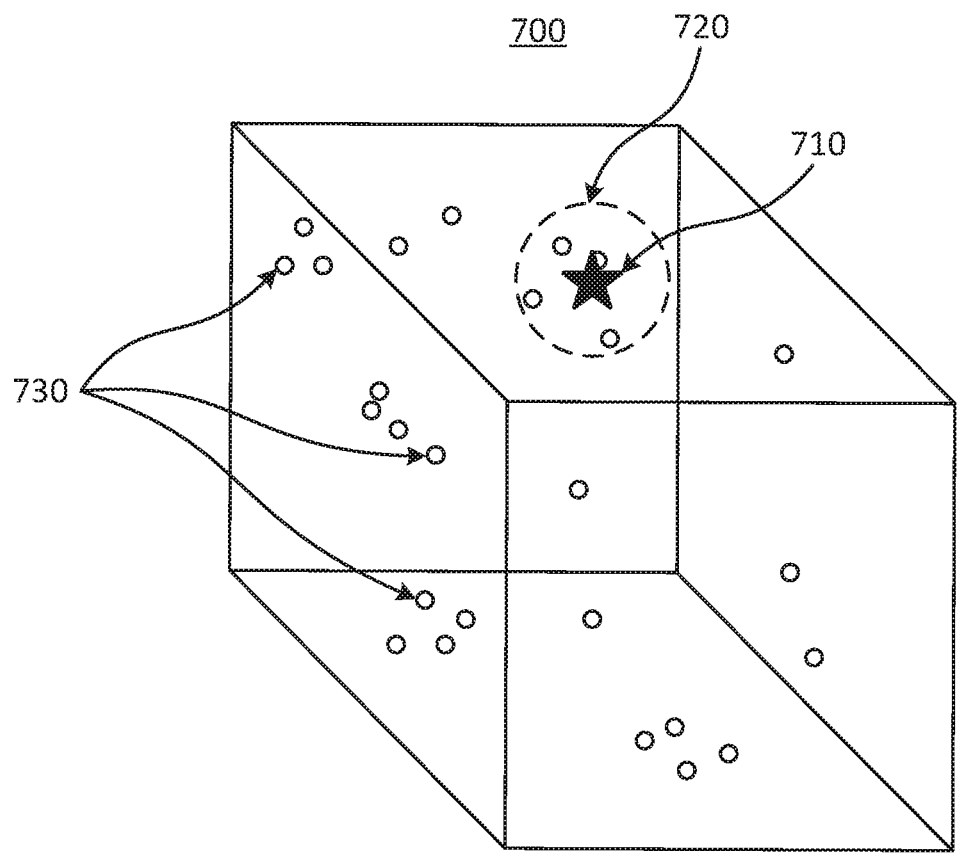
FIG. 7 illustrates an example view of an embedding space.

FIG. 7 illustrates an example view of an embedding space 700. Embedding space 700 includes a point 710 corresponding to an embedding of a user 710 and a plurality of points 730 corresponding to a plurality of entity embeddings. The plurality of entity embeddings may be determined based on the vector representations of the entities determined using the deep-learning model (e.g., after it has been trained as described in connection with FIG. 5-6), and the entity embeddings may be represented in embedding space 700 as points 730. The user embedding may be determined based on the vector representation of the user 560 determined using the deep-learning model, as described in connection with FIG. 5, and the user embedding may be represented in embedding space 700 as point 710. Although embedding space 700 is illustrated as being a three-dimensional space, it will be understood that this is for illustrative purposes only, not by way of limitation, and embedding space 700 may be of any suitable dimension. As an example and not by way of limitation, embedding space 700 may be d-dimensional, and the vector representations on which the embeddings are based (e.g., user and entity embeddings) may be d-dimensional intensity vectors, where d denotes any suitable number of dimensions. Although embedding space 700 is depicted as having only one embedding of a user 710, it will be understood that this is for illustrative purposes only, not by way of limitation, and embedding space 700 may include a plurality of points corresponding to a plurality of other users of social-networking system 160. As an example and not by way of limitation, the steps of FIGS. 5 and 6 may be repeated for other users, to generate embeddings for the other users. In the same example, the deep-learning model may be trained so that the entity embeddings are additionally based on target entities from sets of entities representing the other users.

In particular embodiments, embedding space 700 may be used to predict entities (e.g., entities in the second set of entities) that are relevant to the user. In particular embodiments, social-networking system 160 may identify one or more points corresponding to embeddings of entities that are relevant to the user using a search algorithm. In particular embodiments, an entity may be relevant to the user if there is a predicted likelihood that the user will interact with the entity. The search algorithm may be applied to embedding space 700 to identify points corresponding to entity embeddings that are within a threshold distance of point 710 corresponding to the embedding of the user. Each of these entity embeddings may be associated with a respective entity that may be identified as relevant to the user. In the illustrated example of FIG. 7, the threshold distance is depicted as an area 720 in embedding space 700. As an example and not by way of limitation, point 710 may be a point corresponding to the embedding of the user, and the points identified as being within area 720 of point 710 may include points corresponding to embeddings of entities including pages hosted by social-networking system 160 that correspond to "Wayne Gretzky" and "Boston Créme Pie." In particular embodiments, social-networking system 160 may use any suitable technique for identifying one or more entities that are relevant to a user. As an example and not by way of limitation, social-networking system 160 may use locality-sensitive hashing, hierarchical clustering techniques, ball tree techniques, binary search tree techniques, a space-partitioning data structure for organizing points in a k-dimensional space (e.g., a k-dimensional tree), quantization, any other suitable search algorithm or technique, or any combination thereof. As another example and not by way of limitation, social-networking system 160 may identify a predetermined number of entities as relevant to a user based on the rankings assigned to the entities based on the computed similarity scores, as described in connection with FIG. 6. As an example and not by way of limitation, after the deep-learning model has completed training, social-networking system 160 may select the top ten entities based on their rankings (excluding the target entity 508, which the user is known to have interacted with) as relevant to the user.

In particular embodiments, social-networking system 160 may send the one or more entities identified as being relevant to the user to a user's client system 130 for display to the user. In particular embodiments, the one or more identified entities may be displayed to the user at an interface of an application running on the user's client system (e.g., an application associated with social-networking system 160 or a web browser). As an example and not by way of limitation, the user may enter a search query via an interface of an application running on the user's client system 130 (e.g., an application associated with social-networking system 160), and social-networking system 160 may provide search results based on the rankings of the entities that are responsive to the search query (e.g., identified entities may appear higher in search results) as suggestions to the user in the application. As another example and not by way of limitation, the one or more identified entities may be delivered to the user as a notification (e.g., You like "ice hockey," so you may also like "Wayne Gretzky").

In particular embodiments, an entity identified as relevant to the user may be on with which the user will interact, as predicted by social-networking system 160. In particular embodiments, social-networking system 160 may use embedding space 700 to predict the entities with which the user will positively interact. As an example and not by way of limitation, social-networking system 160 may apply a search algorithm to identify one or more entity embeddings (with which the user has not yet interacted) within a predetermined distance 720 of the embedding of the user (e.g., point 710). The social-networking system 160 may then identify entities (e.g., pages hosted by social-networking system 160) associated with these identified entity embeddings to predict an entity with which the user may positively interact (e.g., "like," click on, or otherwise interact with on social-networking system 160).

Although this disclosure describes and illustrates particular embodiments of FIG. 7 as being implemented by social-networking system 160, this disclosure contemplates any suitable embodiments of FIG. 7 occurring on any suitable interface and as being implemented by any suitable platform or system. As an example, and not by way of limitation, particular embodiments of FIG. 7 may be implemented by client system 130 or third-party system 170. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
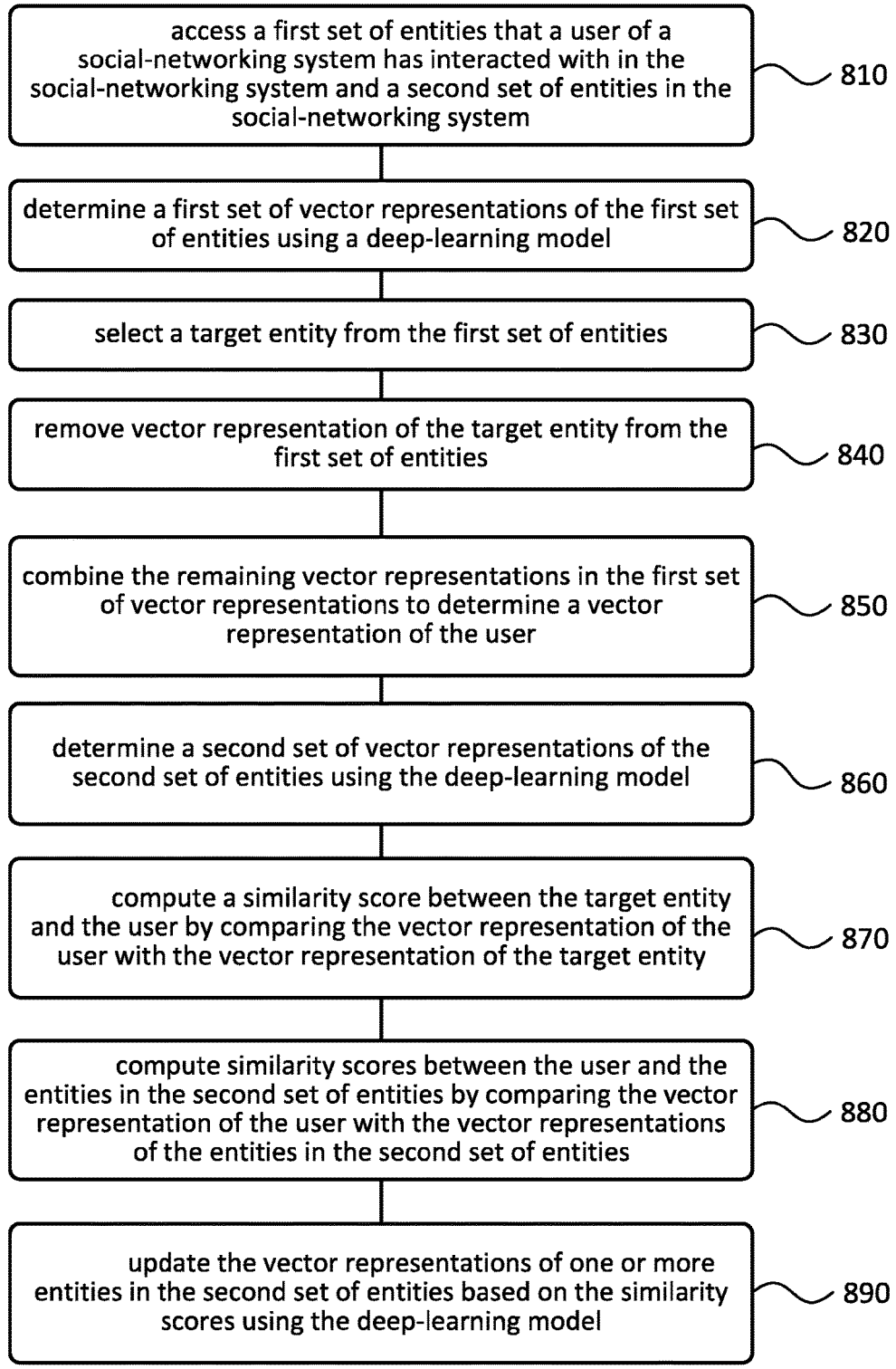
FIG. 8 illustrates an example method for updating vector representations of entities using a deep-learning model.

FIG. 8 illustrates an example method 800 for updating vector representations of entities using a deep-learning model. The method may begin at step 810, where social-networking system 160 may access a first set of entities that a user of a social-networking system has interacted with in the social-networking system and a second set of entities in the social-networking system. At step 820, social-networking system 160 may determine a first set of vector representations of the first set of entities using a deep-learning model. At step 830, social-networking system 160 may select a target entity from the first set of entities. At step 840, social-networking system 160 may remove from the first set of vector representations the vector representation of the target entity. At step 850, social-networking system 160 may combine the remaining vector representations in the first set of vector representations to determine a vector representation of the user. At step 860, social-networking system 160 may determine a second set of vector representations of the second set of entities using the deep-learning model. At step 870, social-networking system 160 may compute a similarity score between the target entity and the user by comparing the vector representation of the user with the vector representation of the target entity. At step 880, social-networking system 160 may compute similarity scores between the user and the entities in the second set of entities by comparing the vector representation of the user with the vector representations of the entities in the second set of entities. At step 890, social-networking system 160 may update the vector representations of one or more entities in the second set of entities based on the similarity scores using the deep-learning model.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for updating vector representations of entities using a deep-learning model including the particular steps of the method of FIG. 8, this disclosure contemplates any suitable method for updating vector representations of entities using a deep-learning model including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference herein.

Systems and Methods

Figure 9:
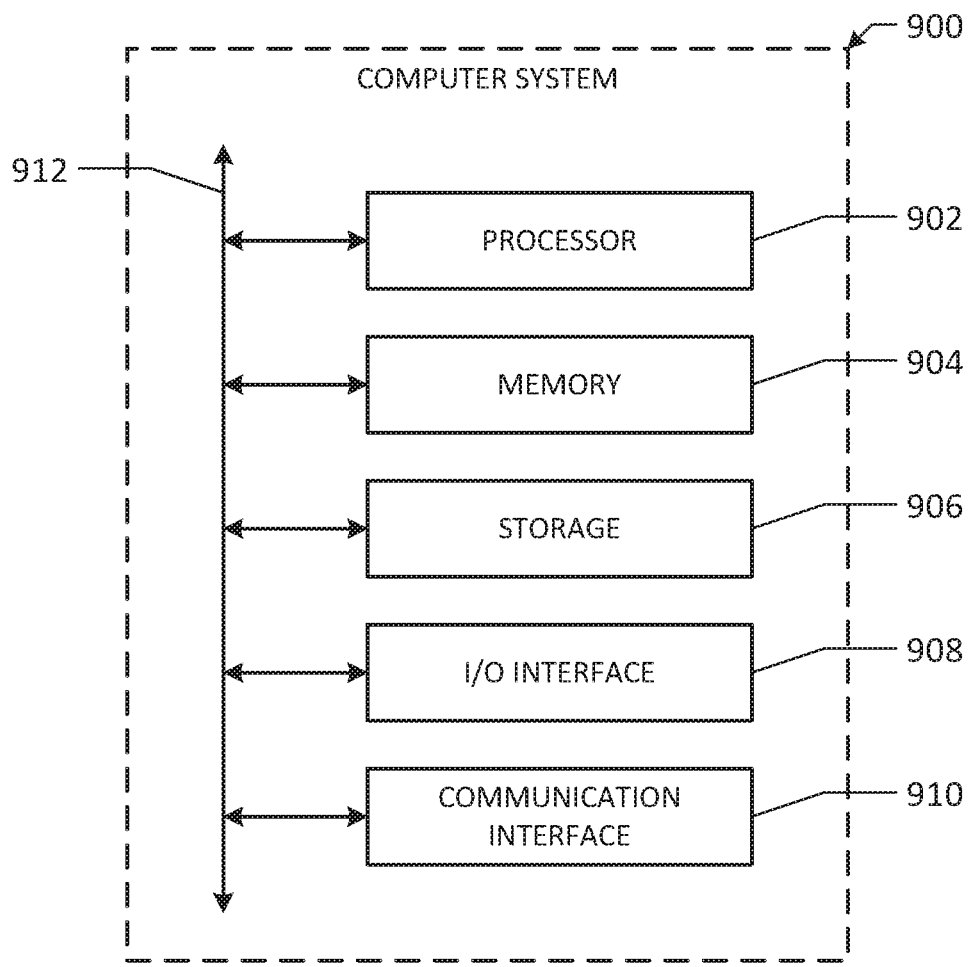
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A method comprising:
accessing, by one or more computing devices:
a first set of entities that a user of a social-networking system has interacted with in the social-networking system, and
a second set of entities that the user has not interacted with in the social-networking system;
determining, by the one or more computing devices, a first set of vector representations of the first set of entities using a deep-learning model;
selecting, by the one or more computing devices, a target entity from the first set of entities;
removing, by the one or more computing devices, the vector representation of the target entity from the first set of vector representations;
combining, by the one or more computing devices, the remaining vector representations in the first set of vector representations to determine a vector representation of the user;
determining, by the one or more computing devices, a second set of vector representations of the second set of entities using the deep-learning model;
computing, by the one or more computing devices:
a similarity score between the target entity and the user by comparing the vector representation of the user with the vector representation of the target entity, and
similarity scores between the user and the entities in the second set of entities by comparing the vector representation of the user with the vector representations of the entities in the second set of entities;
updating, by the one or more computing devices, the vector representations of one or more entities in the second set of entities based on the similarity scores using the deep-learning model; and
generating, by the one or more computing devices, an updated deep-learning model based on the deep-learning model and the updated vector representations of the one or more entities in the second set of entities.

2. The method of claim 1, further comprising:
determining, by the one or more computing devices, a respective embedding for the user and each entity of the second set of entities, wherein:
each respective embedding corresponds to a point in a multi-dimensional embedding space,
the embedding space comprises a plurality of points corresponding to a plurality of entities; and
each respective embedding is based on a respective vector representation determined using the deep-learning model.

3. The method of claim 2, further comprising identifying an entity as relevant to the user by applying a search algorithm to the embedding space, wherein a point corresponding to an embedding of the identified entity is within a threshold distance of the point corresponding to the embedding of the user in the embedding space.

4. The method of claim 3, further comprising sending, to a client system of the user, the identified entity for display to the user.

5. The method of claim 1, further comprising assigning, by the one or more computing devices, a respective ranking to the target entity and to each entity of the second set of entities based on the similarity scores, and wherein updating the vector representations of the one or more entities of the second set of entities is further based on the rankings.

6. The method of claim 5, wherein at least one of the one or more entities of the second set of entities whose vector representations are updated have a similarity score that is greater than the similarity score of the target entity.

7. The method of claim 6, further comprising:
updating, by the one or more computing devices, in response to the at least one of the one or more entities of the second set of entities whose vector representations are updated having a similarity score that is greater than the similarity score of the target entity, the respective vector representation of the at least one of the one or more entities in the second set of entities using the updated deep-learning model such that the similarity score of the at least one of the one or more entities of the second set of entities is less than the similarity score of the target entity.

8. The method of claim 1, wherein the target entity is selected randomly.

9. The method of claim 1, wherein the social-networking system comprises a social graph comprising a plurality of nodes and a plurality of edges connecting the nodes, each of the edges between two of the nodes representing a single degree of separation between them, and wherein the plurality of nodes comprise:
a first node corresponding to the user; and
a plurality of second nodes that each correspond to a respective entity.

10. The method of claim 9, wherein the user has interacted with the first set of entities by a social-networking action of the user, wherein the social-networking action is taken with respect to the first node and a respective second node corresponding to a respective entity of the first set of entities.

11. The method of claim 10, wherein the social-networking action represents an expression of affinity for an entity.

12. The method of claim 1, wherein at least one entity of the first set of entities or the second set of entities comprises a page hosted by the social-networking system.

13. The method of claim 1, wherein the respective vector representations of the first set of entities, the second set of entities, the target entity, and the user each comprise d-dimensional intensity vectors.

14. The method of claim 1, further comprising:
predicting, by the one or more computing devices, a relevance to the user of a particular entity in the second set of entities based on the updated deep-learning model.

15. The method of claim 1, wherein the updating of the vector representations of the one or more entities in the second set of entities is further based on the similarity score between the target entity and the user.

16. One or more computer-readable non-transitory storage media embodying software that is operable when executed to:
access:
a first set of entities that a user of a social-networking system has interacted with in the social-networking system, and
a second set of entities that the user has not interacted with in the social-networking system;
determine a first set of vector representations of the first set of entities using a deep-learning model;
select a target entity from the first set of entities;
remove the vector representation of the target entity from the first set of vector representations;
combine the remaining vector representations in the first set of vector representations to determine a vector representation of the user;
determine a second set of vector representations of the second set of entities using the deep-learning model;
compute:
a similarity score between the target entity and the user by comparing the vector representation of the user with the vector representation of the target entity, and
similarity scores between the user and the entities in the second set of entities by comparing the vector representation of the user with the vector representations of the entities in the second set of entities;
update the vector representations of one or more entities in the second set of entities based on the similarity scores using the deep-learning model; and
generate an updated deep-learning model based on the deep-learning model and the updated vector representations of the one or more entities in the second set of entities.

17. The media of claim 16, wherein the software is further operable when executed to:
determine a respective embedding for the user and each entity of the second set of entities, wherein:
each respective embedding corresponds to a point in a multi-dimensional embedding space,
the embedding space comprises a plurality of points corresponding to a plurality of entities; and
each respective embedding is based on a respective vector representation determined using the deep-learning model.

18. The media of claim 16, wherein the software is further operable when executed to assign a respective ranking to the target entity and to each entity of the second set of entities based on the similarity scores, and wherein updating the vector representations of the one or more entities of the second set of entities is further based on the rankings.

19. A system comprising: one or more processors; and a memory coupled to the processors comprising instructions executable by the processors, the processors operable when executing the instructions to:
access:
a first set of entities that a user of a social-networking system has interacted with in the social-networking system, and
a second set of entities that the user has not interacted with in the social-networking system;
determine a first set of vector representations of the first set of entities using a deep-learning model;
select a target entity from the first set of entities;
remove the vector representation of the target entity from the first set of vector representations;
combine the remaining vector representations in the first set of vector representations to determine a vector representation of the user;
determine a second set of vector representations of the second set of entities using the deep-learning model;
compute:
a similarity score between the target entity and the user by comparing the vector representation of the user with the vector representation of the target entity, and
similarity scores between the user and the entities in the second set of entities by comparing the vector representation of the user with the vector representations of the entities in the second set of entities;
update the vector representations of one or more entities in the second set of entities based on the similarity scores using the deep-learning model; and
generate an updated deep-learning model based on the deep-learning model and the updated vector representations of the one or more entities in the second set of entities.

20. The system of claim 19, wherein the processors are further operable when executing the instructions to:
   determine a respective embedding for the user and each entity of the second set of entities, wherein:
      each respective embedding corresponds to a point in a multi-dimensional embedding space,
      the embedding space comprises a plurality of points corresponding to a plurality of entities; and
      each respective embedding is based on a respective vector representation determined using the deep-learning model.

21. The system of claim 19, wherein the processors are further operable when executing the instructions to assign a respective ranking to the target entity and to each entity of the second set of entities based on the similarity scores, and wherein updating the vector representations of the one or more entities of the second set of entities is further based on the rankings.

* * * * *